United States Patent [19]

Franch

[11] 4,174,611
[45] Nov. 20, 1979

[54] HYDRAULIC MACHINE

[76] Inventor: Gino Franch, Via G. Avezzana 10, Milan, Italy

[21] Appl. No.: 886,924

[22] Filed: Mar. 14, 1978

[30] Foreign Application Priority Data

Mar. 17, 1977 [IT] Italy ............................... 4816 A/77
Mar. 17, 1977 [IT] Italy ............................... 4817 A/77

[51] Int. Cl.$^2$ ............................................. F16D 33/00
[52] U.S. Cl. ......................................... 60/325; 60/435; 415/70
[58] Field of Search ................. 60/413, 435, 439, 440, 60/473, 907, 325; 415/70, 88, 89, 120; 417/355

[56] References Cited

U.S. PATENT DOCUMENTS

1,527,474  2/1925  Faure .................................... 415/70
4,069,669  1/1978  Pitkanen .............................. 60/325

Primary Examiner—Edgar W. Geoghegan
Attorney, Agent, or Firm—Lowe, King, Price & Becker

[57] ABSTRACT

The hydraulic machine comprises an outer rotor, rotatably mounted around a longitudinal axis and connected, through an input shaft, to a driving motor, and an inner rotor mounted at the interior of the outer rotor, rotatable around a transverse axis, and connected, through a gear drive, to an auxiliary shaft coaxial to the input shaft. A hydraulic circuit is arranged at the interior of the inner rotor, and it presents an active circuit consisting of a pipe winding. The ends of the hydraulic circuit are connected, through rotary connections, to a fixed outflow and a fixed inflow connection. Upon rotation of the outer rotor and of the inner rotor around their respective axis, the inner rotor is subjected to a field of accelerations of Coriolis which generates between the ends of the active circuit a substantially sinusoidally varying pressure difference.

15 Claims, 15 Drawing Figures

HYDRAULIC MACHINE

SUMMARY OF THE INVENTION

The present invention relates to a hydraulic machine which can be used alternately as a pump or as a torque transducer.

An object of the invention is to provide a machine of the above mentioned type which, when used as a pump, can generate very high pressure and, when used as a torque transducer in combination with a particular hydraulic motor forming also part of the invention, presents a very high degree of efficiency.

According to the invention, an outer rotor rotatably mounted around a fixed longitudinal axis is coupled to a driving motor through an input shaft. At the interior of said outer rotor there is rotatably mounted, around a transverse axis which is perpendicular to the rotational axis of the outer rotor, an inner rotor which is also coupled through a gear drive to an auxiliary shaft which is coaxial to the rotational axis of the outer rotor. The auxiliary shaft can be anchored to the machine frame, thus acting as a torque absorber, or it can be used for purposes of control and transmission of power. To the inner rotor there is associated a hydraulic circuit, which presents at least a so-called "active circuit", the projection of which onto a plane passing through the rotational axis of the inner rotor defines with the axis a final surface different from zero. The hydraulic circuit of the inner rotor is connected with its ends, through rotary connections, with a fixed outflow and a fixed inflow connection.

The hydraulic system of the inner rotor and the fluid contained therein are subjected, due to the rotary movement of the outer rotor around its longitudinal axis and the simultaneous rotary movement of the inner rotor around its transverse rotational axis, to a field of accelerations of Coriolis and consequently to the corresponding forces of Coriolis. The forces produce in correspondence with the ends of the active circuit a pressure which is substantially sinusoidally varying, and a corresponding current or flow in the fluid contained in the hydraulic circuit.

In the hydraulic machine according to the invention, the sum of the powers transmitted to the input shaft, to the auxiliary shaft and to the fluid is at any moment equal to zero. Consequently, the hydraulic machine according to the invention can be used for any desired exchange of power between the input shaft, the auxiliary shaft, and the fluid of the hydraulic circuit, independently from the sign of the transmitted powers. Usually the input shaft transmits the power from the driving motor to the outer rotor. It is however possible for a transmission of power from the outer rotor to the driving motor.

The hydraulic machine according to the invention can be used as a pump by providing in the hydraulic circuit a non-return valve which leads to a unidirectional flow of the fluid. The pump according to the invention can generate pressures which are substantially greater than the pressures generated by the hydrodynamic pumps now in use.

The hydraulic machine according to the invention can be further used as a torque transducer between a driving motor and a utilizer, and more precisely in combination with the hydraulic motor according to the invention, which is connected to both ends of the hydraulic circuit, and which is driven by the sinusoidally changing pressure of the fluid.

In both of the above mentioned cases of utilization of the hydraulic machine according to the invention, the auxiliary shaft of the machine can be anchored to a fixed part of the machine itself. In particular cases, however, the auxiliary shaft can be utilised for the emission or the derivation of mechanical energy, or for control purposes.

The machine according to the invention presents, in all cases of its possible utilization, a high degree of efficiency, since the losses in the rotary connections of the hydraulic circuit, the gear drive between the inner rotor and the auxiliary shaft, and the losses in the stream or flow are very limited.

The above and other characteristic features of the hydraulic machine according to the invention, and the advantages deriving therefrom, will appear evident from the following detailed description of one preferred embodiment of the same made with reference to the accompanying drawings, and the novel features will be particularly pointed out in the appended claims.

DESCRIPTION OF THE PREFERRED EMBODIMENT

Figures 1, 2, 3:
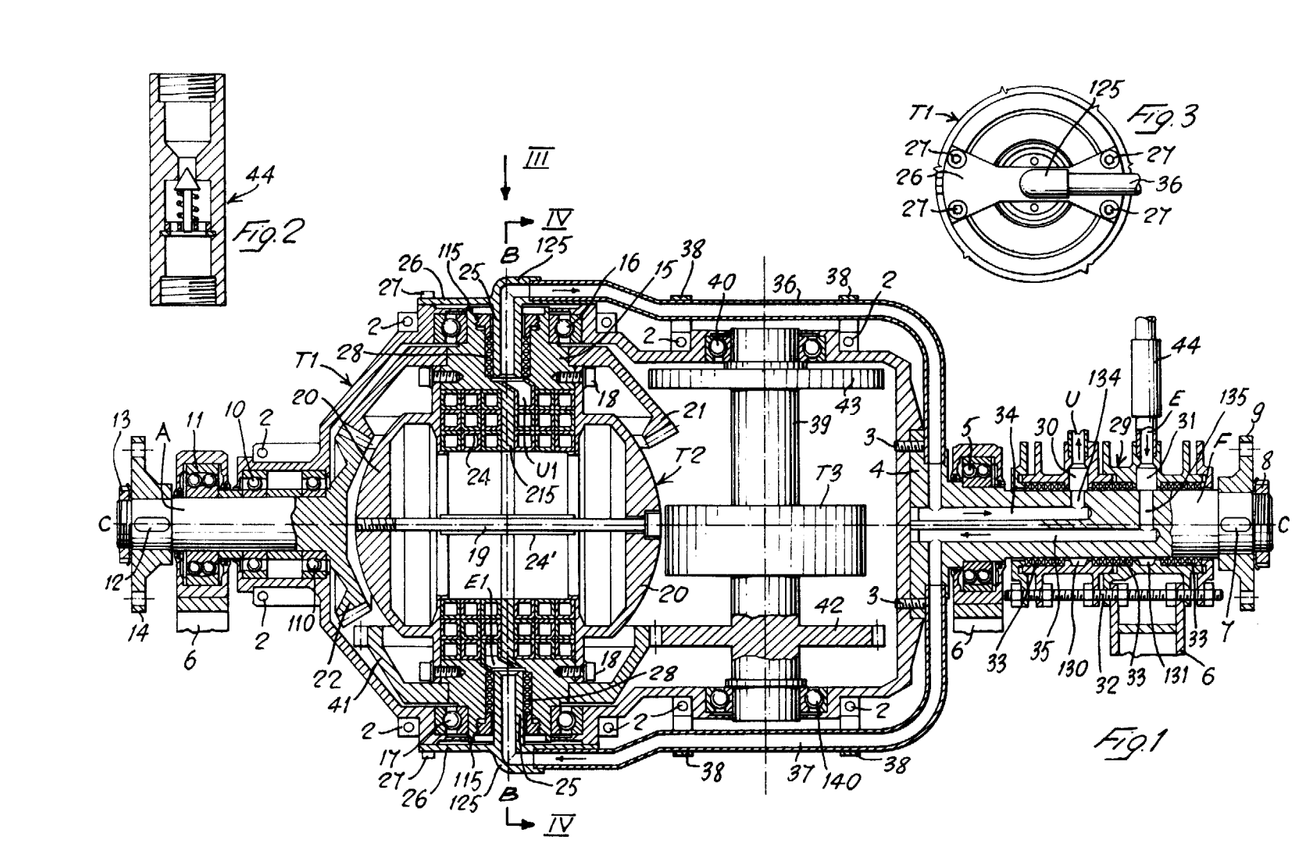
FIG. 1 is a longitudinal section of a hydraulic machine according to the invention.
FIG. 2 is a longitudinal section of a non-return valve provided in the inflow connection of the hydraulic machine of FIG. 1.
FIG. 3 is a partial top view of the machine taken in the direction of arrow III—III of FIG. 1.
Figure 4:
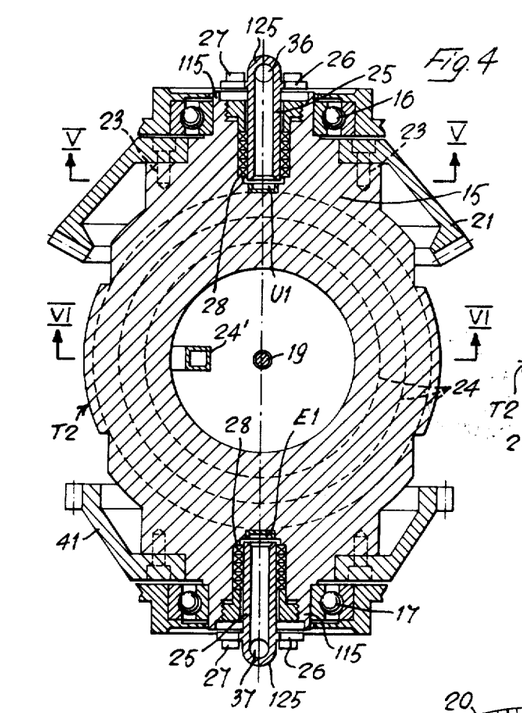
FIG. 4 is a section along line IV—IV of FIG. 1.
Figure 5:
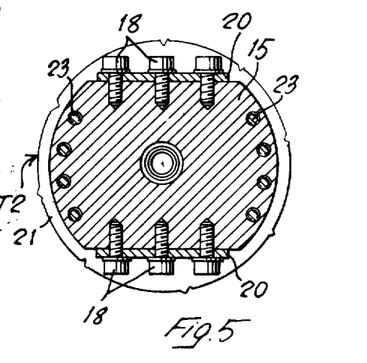
FIG. 5 is a partial section along line V—V of FIG. 4.

The hydraulic machine according to the invention consists of an outer rotor T1 which is constructed as a hollow closed casing made of two parts. The two parts of the said casing are connected the one to the other by means of connecting lugs 2 and bolts (not shown).

Figures 11, 12, 13, 14, 15:
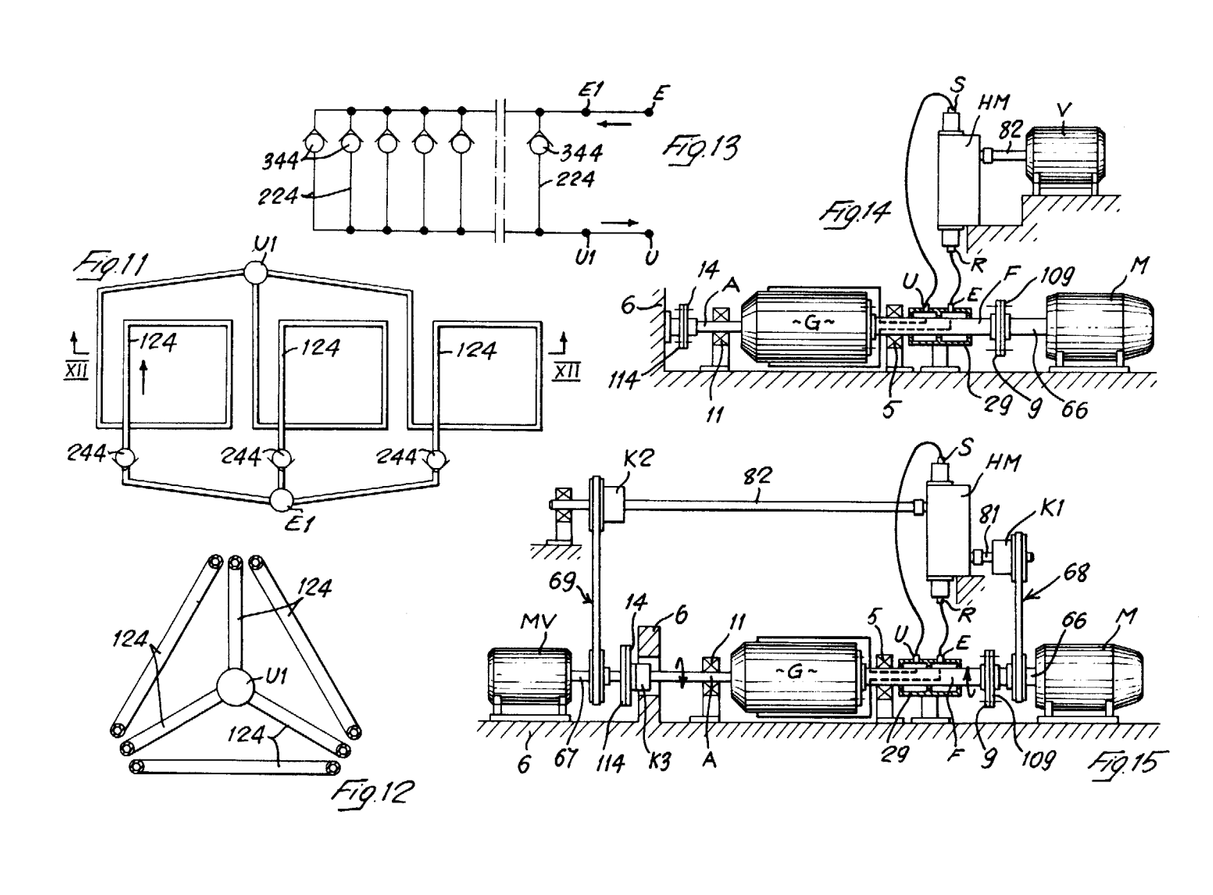
FIG. 14 is a circuit diagram representing the utilization of the hydraulic machine according to FIGS. 1 to 6, in combination with the hydraulic motor of FIGS. 7 and 8, as a torque transducer between a driving motor and a utilizer.
FIG. 15 is a circuit diagram of still a further utilization of the hydraulic machine in combination with the hydraulic motor, said machine acting as a torque transducer between a driving motor and a machine which is working alternately as a utilizer and as a motor.

In correspondence with the right head end (with reference to FIG. 1) of the outer rotor T1, there is secured, to the said head end, an input shaft F which is coaxial to the outer rotor T1, by means of a flange 4 and bolts 3. The outer rotor T1 is rotatably mounted on the machine frame by means of the input shaft F and a bearing 5. On the free end of the input shaft F there is secured, with the aid of a key 7 and a threaded nut 8, a coupling flange 9, which is connected to a driving motor M, as illustrated in FIGS. 14 and 15.

In correspondence with the opposite head end of the outer rotor T1 (at the left hand side in FIG. 1), there is provided an auxiliary shaft A, coaxial to the said rotor and to the input shaft F, which enters into the rotor. The outer rotor T1 is rotatably mounted on the auxiliary shaft A by means of bearings 10, 110. The auxiliary shaft A is in turn rotatably mounted in the machine frame 6 by means of a bearing 11. On the free end of the auxiliary shaft A there is secured, by means of a key 12 and a threaded nut 13, a coupling flange 14, which, as shown for example in FIGS. 14 and 15, can be anchored to the machine frame 6 by means of a counter-flange 114, or it can be connected to a coaxial shaft for control and transmission purposes, as will be later described in connection with FIG. 15.

At the interior of the outer rotor T1 there is arranged an inner rotor T2, which is rotatably mounted around an axis B—B, which is perpendicular to the longitudinal rotational axis C—C of the outer rotor T1. The inner rotor T2 consists of an annular central part 15, which is rotatably arranged at the interior of outer rotor T1 by means of two opposite stub shafts 115 and bearings 16, 17. Two cover caps 20 are secured, by means of screws 18 and a central tie rod 19, laterally to the central part 15. With reference to FIG. 1, in correspondence with the upper end of the inner rotor T1 there is secured, by means of screws 23, a bevel gear 21, which meshes with a bevel gear 22 secured onto the inner end of the auxiliary shaft A.

At the interior of the inner rotor T2 there is arranged a hydraulic circuit, which rotates together with the rotor around the axis B—B, presenting an active circuit which, in the embodiment shown in FIGS. 1 to 6, consists of a plurality of pipe coils connected in series, arranged one above the other in the axial direction B—B and one next to the other in the direction perpendicular to the said axial direction, in the central part 15, which forms a pipe winding 24. The pipe coils of the winding 24 which are arranged at both sides of an inner stiffening rib 215 of the central part 15 of the inner rotor are connected one to the other by means of a pipe section 24' which bridges over the said stiffening rib 215, as particularly shown in FIG. 6. Fluid flows into winding 24 through inlet end E1 and out through outlet end U1.

Both stub shafts 115 of the inner rotor T2 present a coaxial bore, into which there is inserted a nipple 25 secured to the outer rotor T1. More particularly each nipple 25 is secured or formed in a plate 26, which is secured on the outer surface of the outer rotor T1 by means of screws 27. The seal between the nipples 25 and the stub shafts 115 of the inner rotor T2 can be obtained with any suitable sealing device adapted for use with rotary connections of this type. In the embodiment as shown the said sealing devices consist of packing sleeves 28.

The ends E1, U1 of the pipe winding 24 arranged at the interior of the inner rotor T2 and forming the active portion of the hydraulic circuit, are each connected with a bore of the stub shaft 115 of the inner rotor T2 and consequently with the corresponding nipple 25. The nipples 25 are in turn connected with a fixed inflow E and a fixed outflow U for any suitable fluid, for example hydraulic oil. For this purpose the input shaft F is surrounded by a connecting sleeve 29 consisting of a plurality of coaxial sleeve portions and two annular end plates, said sleeve 29 being secured or anchored to the machine frame 6. The said connecting sleeve 29 presents two radial bores 30 and 31 connected with the outflow U and the inflow E, and also, in correspondence with the bores, it presents inner annular grooves 130 and 131 respectively. The single portions of the connecting sleeve 29 are connected together by means of parallel tie bolts 32. At least one of the tie bolts 32 can be used for anchoring the sleeve 29 to the machine frame 6. The seal between the fixed connecting sleeve 29 and the rotating input shaft F is obtained by means of packings 33.

In the input shaft F there are provided two bores 34, 35 parallel to the axis of the shaft, and which are connected respectively to radial bores 134 and 135. The radial bore 134 is arranged in correspondence with the annular groove 130 provided for the outflow U, while the radial bore 135 is arranged in correspondence with the other annular groove 131 of the connecting sleeve 29, provided for the inflow E. The axial bores 34 and 35 of the input shaft F are moreover connected each to a nipple 25 through pipes 36 and 37, respectively. The pipes 36, 37 are secured on the outer surface of the outer rotor T1 by means of fastening brackets 38 and are sealingly connected with the outer ends of the respective nipples 25, said ends being bent so as to be aligned approximately paralel to the axis C—C.

With the simultaneous rotation of the outer rotor T1 around the axis C—C and of the inner rotor T2 around the axis B—B, there is produced a torque due to the forces of Coriolis acting on the inner rotor T2, which torque tends to rotate the inner rotor T2 around an axis which is perpendicular to the common planes of the axes C—C and B—B. The torque produces vibrations and additional stresses on the bearings 5, 10, 110 and 11. The vibrations are eliminated by means of a compensating rotor T3, which is secured onto a shaft 39 which is perpendicular to the longitudinal axis C—C, i.e. it is parallel to the rotation axis B—B of the inner rotor T2. The shaft 39 is arranged at the interior of the outer rotor T1 by means of bearings 40, 140. The compensating rotor T3 is driven into rotation in opposite directions by the inner rotor T2. For this purpose, with reference to FIG. 1, at the lower end of the inner rotor T2 there is secured a gear 41 which meshes with a gear 42 secured to the shaft 39 of the compensating rotor T3. On the side of the compensating rotor T3 which is opposite to the gear 42 there is secured on the shaft 39 a disc 43 which serves as a counterweight to the gear 42.

The rotational speed and the axial moment of inertia of the compensating rotor T3 are chosen in such a manner that the torque produced by the compensating rotor T3 is equal to but contrary to the mentioned torque of the inner rotor T2 and consequently the additional stresses on the bearings 5, 10, 110 and 11 are neutralized.

The outer rotor T1, driven by the motor M through the input shaft F, rotates around the longitudinal axis C—C with an angular speed $\omega_f$. Consequently, the inner rotor T2 is rotated around the longitudinal axis C—C with the same angular speed $\omega_f$. At the same time, the inner rotor T2 rotates around the transverse rotational axis B—B with an angular speed $\omega_b$, which is determined by the planetary gearing provided by the outer rotor T1 and by the bevel gears 21, 22.

The fluid contained in the pipe winding 24 of the inner rotor T2 is subjected also to both angular speeds $\vec{\omega}_f$ and $\vec{\omega}_b$. Each point of the fluid in the pipe winding 24, to which a vector $\vec{r}$ can be assigned, is subjected to an acceleration of Coriolis which corresponds to the vector $2\vec{\omega}_f \times (\vec{\omega}_b \times \vec{r})$. The respective forces of Coriolis present components which are tangential to the longitudinal axis of the pipe which makes up the pipe winding 24. The pipe winding 24 provides an active circuit for the hydraulic circuit arranged at the interior of the inner rotor T2. The tangential components of the forces of Coriolis produce at the ends U1, E1 of the pipe winding 24 a pressure difference "p", which is proportional to the product of the quantities $\omega_f$, $\omega_b$, S and sin $\Psi$. By reference letter S there has been indicated the sum of the cross-sectional areas of the coils connected in series with the pipe winding 24, and by $\Psi$ there has been indicated the angle between the perpendicular to the mentioned cross-sectional area, and the longitudinal axis C—C, i.e. the axis of rotation of the outer rotor T1. The above mentioned pressure difference "p" is dependent upon sin $\Psi$ and consequently it varies sinusoidally. The pressure difference "p" produces a stream or flow in the fluid, presenting a flow speed which periodically varies and in which each point corresponds to a vector $\vec{v}$. Due to this flow speed $\vec{v}$, all points in the fluid contained in the pipe winding 24 are subjected to a second acceleration of Coriolis which corresponds to the common expression $2\vec{\omega}_f \times \vec{v}$. The rotation of the inner rotor T2 around the axis B—B is either braked or accelerated through the corresponding forces of Coriolis, depending upon the sign of these forces. By $\mu_b$ there has been indicated the total moment of the mentioned forces in relation to the rotational axis B—B and by $S_t$ there has been indicated the cross section of the pipe winding. The power $p \cdot S_t \cdot v$ of the fluid is at any moment equal to and contrary to the power $\mu_b \cdot \omega_b$ of the inner rotor T2. Due to the torque $\mu_b$, upon the auxiliary shaft A there is induced a torque $\mu_a$ and upon the input shaft F a torque $\mu_f$. The torques $\mu_a$ and $\mu_f$ are equal in value but are opposingly directed. The sum of the powers transmitted to the shafts A and F and to the fluid is equal to zero.

The auxiliary shaft A can be used as a torque absorber, by anchoring its flange 14 to the machine frame. In this case, the auxiliary shaft A presents an angular speed $\omega_a = 0$. The auxiliary shaft A can however present an angular speed $\omega_a \neq 0$, whenever the flange 14 is connected with the shaft of a utilizer or a control device, as described in connection with FIGS. 14 and 15. In this case through the auxiliary shaft A there is derived a power $\mu_a \cdot \omega_a$, which can be positive or negative, according to the sign of $\omega_a$. In response to a change of speed $\omega_a$ of the auxiliary shaft A, the angular speed $\omega_b$ of the inner rotor T2 will vary, and consequently also the resultant of pressure difference "p" will also vary. In the limit case where $\omega_a = \omega_f$ the torques $\mu_a$ and $\mu_b$ and consequently the pressure difference and the transmitted powers are nullified.

Figures 6, 9, 10:
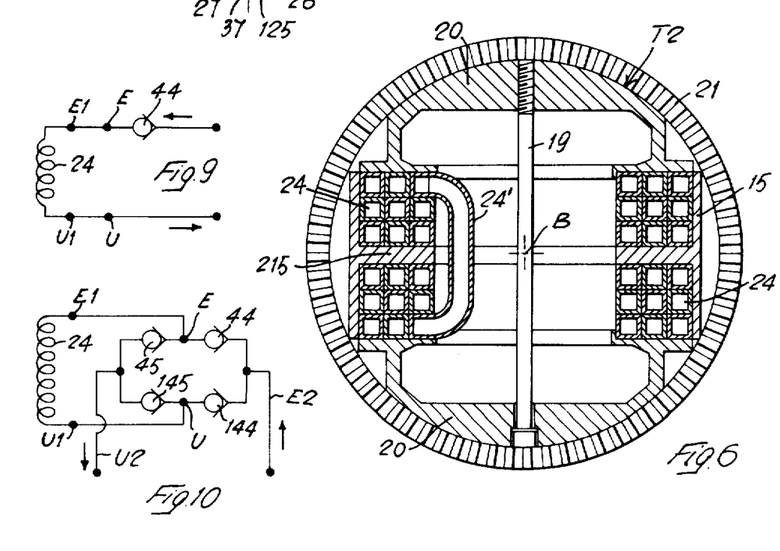
FIG. 6 is a section of the inner rotor along line VI—VI of FIG. 4.
FIGS. 9 to 13 are various circuit diagrams of the hydraulic circuit of the machine.

The hydraulic machine according to the invention can be utilized as a pump. Several embodiments are possible in this case. The simplest mode is that of providing the inflow E with a non-return valve 44 which opens in the inflow direction, as is diagrammatically shown in FIGS. 1 and 9. In FIG. 9 there is diagrammatically shown the circuit connection of the active pipe winding 24 of the inner rotor T2, with the provision of a non-return valve 44 in correspondence with the inflow E. The arrows show the direction of the flow. There can be also provided a non-return valve in correspondence with the outflow U, opening in the direction of the outflow. In FIG. 2 there is illustrated a possible embodiment of the non-return valve 44, which however can be constructed in any other suitable manner, such as a ball valve or a membrane valve, or the like.

The delivery fluctuations of a hydraulic machine according to the invention, when used as a pump, are levelled in the manner shown in FIG. 10. In this arrangement an inlet pipe E2 is connected through two non-return valves 44, 144 opening in the inflow direction, and arranged in parallel, both with the inflow E and with the outflow U. An outlet pipe U2 is connected with the inflow E and with the outflow U through a pair of non-return valves 45, 145 opening in the outflow direction.

The active circuit 24 arranged at the interior of the inner rotor T2 can as a general rule be constructed in such a manner that its projection on a plane passing through the rotation axis B—B of the inner rotor T2 defines with the axis B—B a surface which is different from zero. Therefore, the active circuit 24 can present any suitable path, and for example it can comprise even a single or a partial pipe coil, and in particular it can consist of at least one pipe section straight or curved, substantially parallel to the rotation axis of the inner rotor T2 and at a radial distance from the said axis B—B.

The fluctuations of the delivery, in the case of utilization as a pump of the hydraulic machine according to the invention can be also levelled in the following manner: the active circuit provided at the interior of the inner rotor consists of a plurality of active portions arranged equiangularly with respect to each other around the rotation axis B—B, with each portion connected in parallel with the inflow E and the outflow U, through a corresponding non-return valve preferably arranged at the interior of the inner rotor T2. Such an arrangement is diagrammatically shown in FIGS. 11 and 12. In this embodiment, the active circuit of the hydraulic circuit consists of three equal portions 124 which are angularly equispaced every 120° around the inner rotor T2. The active portions 124 consist each of 1 and ½ turns of pipe coil and are connected in parallel with the outflow U, and more precisely with the outflow connection U1 and each one, through a non-return valve 144 incorporated in the inner rotor T2 and opening in the direction of the inflow, being connected with the inflow E, and more precisely with the inflow connection E1. In FIG. 11 there is illustrated an embodiment of the active circuit composed of the portions 124, while FIG. 12 shows a diagrammatical cross section through the three active portions 124 of the inner rotor T2.

In the embodiment diagrammatically illustrated in FIG. 13, the active circuit carried by the inner rotor T2 consists of a plurality of straight pipe portions which are parallel to the axis B—B of the inner rotor T2 and are arranged angularly equispaced along the circumference of the inner rotor, said pipe portions 224 being connected in parallel with the outflow, and more precisely with the outflow connection U1, and each one being also connected through a non-return valve 334 opening in the direction of the inflow with the inflow E and more precisely with the inflow connection E1.

Figure 7:
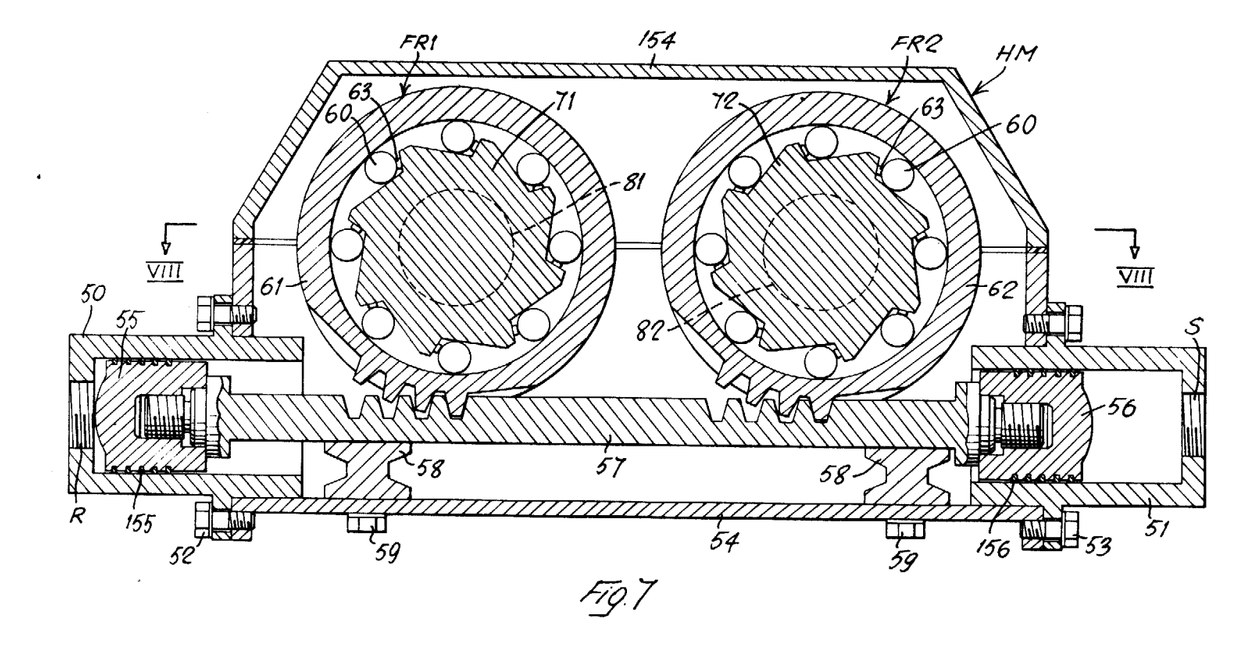
FIG. 7 is a longitudinal section of a hydraulic motor associated with the hydraulic machine of FIGS. 1 to 6.
Figure 8:
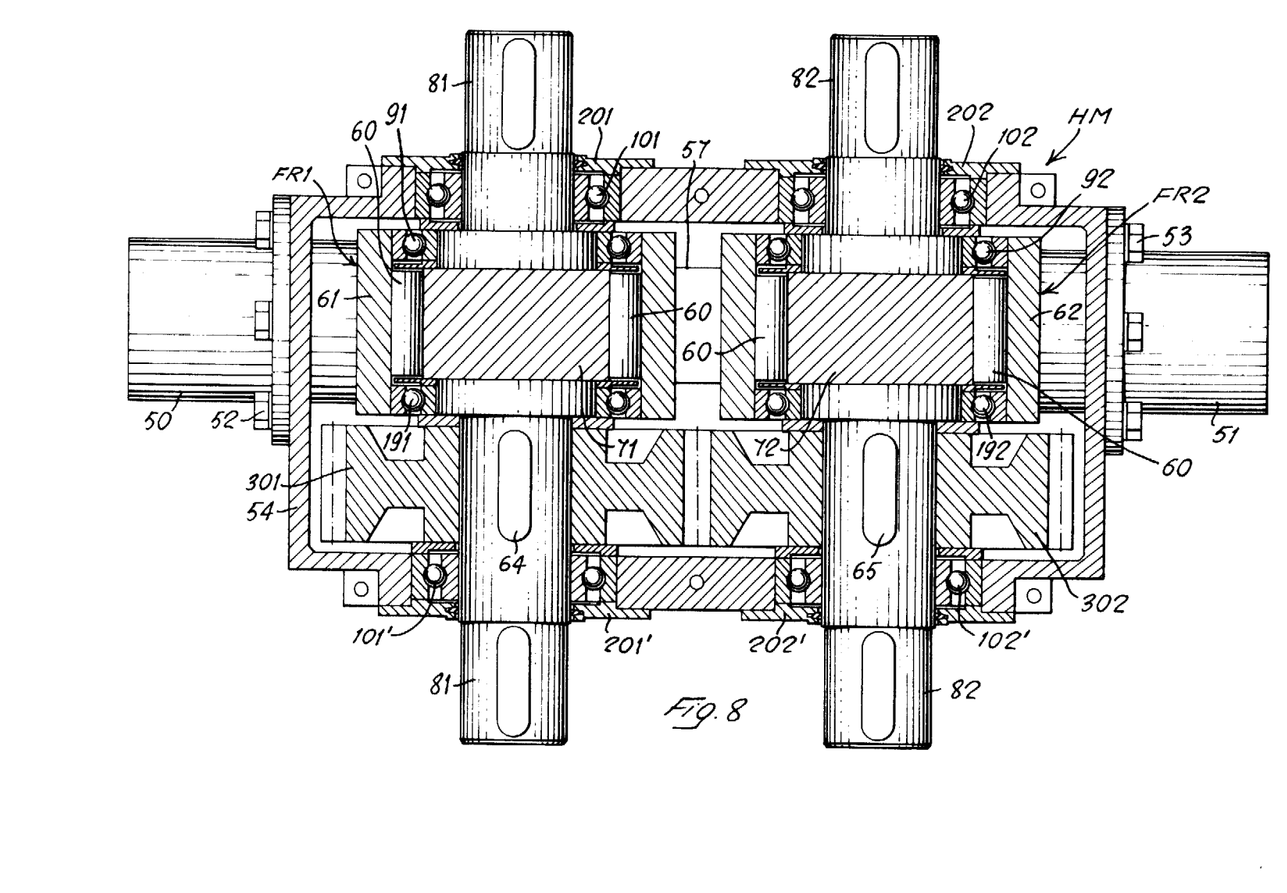
FIG. 8 is a section of the hydraulic motor along line VIII—VIII of FIG. 7.

The hydraulic machine according to the invention can also be utilized as a torque transducer, in combination with a hydraulic motor, which can be driven with a pressure difference which fluctuates sinusoidally. A possible embodiment of such a hydraulic motor HM is shown in FIGS. 7 and 8. The hydraulic motor HM consists of two coaxial working cylinders 50, 51 which are secured, by means of flanges and screws 52, 53 on opposite sides of a casing 54 and which are engaged each by a piston 55, and 56, respectively, provided with piston rings 155, resp. 156. Both pistons 55, 56 are connected the one to the other through a toothed rack 57 arranged at the interior with casing 54. In correspondence with the outer head ends of both cylinders 50, 51 there are provided threaded bores R, and S, respectively. The toothed rack is mounted on guides 58 which are fastened at the interior of the casing 54 by means of screws 59. The guides 58 are arranged in proximity to the cylinders 50 and 51 and serve as end abutments for the respective pistons 55 and 56, in such a manner as to avoid the contact of the pistons 55, 56 with the outer head end wall of the cylinders 50, 51.

The toothed rack 57 is in engagement with outer rings 61 and 62, which are partially toothed, of two freewheels FR1 and FR2. Each freewheel FR1 and FR2 consists of an inner rotor 71 and 72, respectively, which is secured on a shaft 81, and 82, respectively, and preferably is made of one piece with the shaft, and which is rotatably mounted on bearings 91, 191, and 92, 192 inside an outer ring 61 and 62. The inner rotor 71 or 72 presents on its circumference a plurality of wedge-shaped recesses, in each of which there is provided a locking roller 60 which is intended to cooperate with the inner surface of the outer rings 61 and 62. The locking rollers 60 are urged in the locking direction of the corresponding freewheel by a spring 63.

The shafts 81, 82 of both freewheels FR1 and FR2 project out, with both of their ends, of the casing 54 closed by the cover 154, and they are rotatably mounted by means of bearings 101, 101' and 102, 102' and bearing cover plates 201, 201' and 202, 202'.

Each freewheel FR1 and FR2 can transmit a torque only in a direction of rotation which corresponds to its locking direction. Therefore, both freewheels FR1 and FR2 are constructed with contrary locking directions. Their outer rings 61 and 62 are coupled to the common toothed rack with the same ratio of transmission. The freewheel FR1 consequently can transmit a torque to its respective shaft 81 only upon sliding movement of the toothed rack 57 towards the right, referring to FIG. 7, while the other freewheel is locked. The freewheel FR2 can transmit a torque to its respective shaft 82 only upon movement of the toothed rack 57 towards the left, referring to FIG. 7, while the other freewheel FR1 is locked.

Obviously the freewheels FR1 and FR2 can be constructed in any other suitable manner. The basic requirement is that both output shafts 81, 82 of the hydraulic motor HM be driven alternately in opposite rotational directions by the common toothed rack 57 through the freewheels FR1, FR2. Moreover, both output shafts 81, 82 are coupled the one to the other by means of two gears 301, 302, which are secured, by means of keys 64 to the shafts 81, 82 at the interior of the motor casing 54, and which constantly mesh together. Consequently, both output shafts 81, 82 present equal and contrarily directed angular speeds, and the direction of the torques transmitted by the shafts does not change together with the changing direction of movement of the toothed rack 57. From the output shafts 81, 82 there can be derived power for different utilizers, whereby each utilizer can be operatingly connected with either one of the ends of the said output shafts, depending on its requirements.

The mode of operation of the hydraulic motor HM according to FIG. 7, will now be described with reference to the circuit diagram of FIG. 14. In this connection, the following notations are used:

"r" = Radius of the pitch circle of the outer toothing of the outer rings 61, 62 of the freewheels FR1 and FR2.

"w" = Speed of the movement of the toothed rack 57.

$W_\alpha$ = Speed of the movement of the toothed rack 57 in the locking condition of the freewheel FR1 (synchronous run of inner rotor 71 and outer ring 61).

$W_m$ = Maximum value of the speed of the movement of the toothed rack 57.

$\alpha$ = Amplitude of the phase angle $\Psi$, at which the locking condition of the free wheels FR1, FR2 begin.

$\Psi$ = Angle between the longitudinal rotational axis C—C of the outer rotor T1 of the hydraulic machine according to FIGS. 1 to 13 and the perpendicular to the surface of the active circuit 24 of the hydraulic circuit of the said machine.

$\Psi(\gamma,\delta)$ = Portion of the angle $\Psi$ with the limit values $\gamma$ and $\delta$.

$\omega$ = Absolute magnitude of the angular speed of the output shafts 81 and 82 of the hydraulic motor HM.

$\omega_L$ = Absolute maximum value of the angular speed of the outer rings 61 and 62 of the freewheels FR1 and FR2.

$\omega'$ = Angular speeds of the outer rings 61 and 62, which correspond to the speed of movement of the toothed rack 57.

In FIG. 14 there is represented the circuit diagram of a hydraulic machine G, which is utilized as a torque transducer between a driving motor M and a utilizer V. The auxiliary shaft of the hydraulic machine G is secured to the machine frame 6 by means of its flange 14 and a counter-flange 114, while its input shaft F is connected to the driving shaft 66 of driving motor M through a flange 9 and a counter-flange 109. The inflow E and the outflow U of the connecting sleeve 29 of the hydraulic machine G are connected with connections R and S of the working cylinders 50 and 51 of the hydraulic motor HM. An output shaft, for example the shaft 82 of the hydraulic motor HM, is coupled to the utilizer V.

The sinusoidally changing pressure difference produced by the hydraulic machine G between the input E and the output U is transmitted onto the pistons 55,56 of the working cylinders 50, 51 and the toothed rack 57, which is shifted to-and-fro by the said pistons, assumes a corresponding speed "w" which is changing. To the changing speed of the toothed rack 57 there corresponds an angular speed $\omega' = w/r$ of the outer rings 61, 62 driven by the toothed rack. For $|\omega'| = \omega$ the locking condition (synchronous run of rotors 71, and 72 and outer rings 61, and 62) of the freewheels FR1 and FR2 is obtained, depending on whether w>0 or w<0. The speed "w" cannot exceed however the maximum speed $W_m$. The maximum speed $W_m$ depends on the characteristics the hydraulic machine G and of the hydraulic motor HM, as well as on the instantaneous speeds. The maximum speed $W_m$ corresponds to the maximum value $\omega_L = W_m/r$ of the angular speed of the outer rings 61 and 62 of both freewheels FR1 and FR2.

For $\omega > \omega_L$ the locking condition of both freewheels FR1 and FR2 is not reached, and therefore no power can be transmitted to the output shafts 81 and 82 of the hydraulic motor HM. For $\omega < \omega_L$ there is an angle $\Psi = \alpha < 180°$, at which the speed of the toothed rack 57 (speed "w") reaches the value $W_\alpha = \omega \cdot r$, which corresponds to the locking condition (synchronous run of the inner rotor 71 and of the outer ring 61) of the freewheel FR1. The locking condition of the freewheel FR2 is reached when on the contrary $\Psi+180°+\alpha$, where the speed of the toothed rack 57 takes the value $w=-W_\alpha$. When $\omega=$ constant the hydraulic motor coupled to the hydraulic machine presents the following cyclical mode of operation:

Transitional phase $\Psi$ (0°; $\alpha$)

The speed of the toothed rack 57 changes from $-W_\alpha$ to $+W_\alpha$ and the locking condition passes from freewheel FR2 to freewheel FR1. No torque is transmitted to the output shafts 81 and 82 of the hydraulic motor HM.

Working phase $\Psi$ ($\alpha$; 180°)

The locking condition of the freewheel FR1 (synchronous run of the inner rotor 71 and of the outer ring 61) is reached, and the toothed rack 57 transmits torque and power to the output shaft 81, and more precisely to the output shafts 81, 82 of the hydraulic motor HM.

Transitional phase $\Psi$ (180°; 180°$+\alpha$)

The speed of the movement of the toothed rack 57 varies from $+W_\alpha$ to $-W_\alpha$ and the locking condition passes from the freewheel FR1 to the freewheel FR2. No torque is transmitted to the output shafts 81, 82 of the hydraulic motor HM.

Working phase $\Psi$ (180°$+\alpha$; 360°)

The locking condition of the freewheel FR2 (synchronous run of the inner rotor 72 and of the outer ring 62) is reached, and the toothed rack transmits torque and power as in the working phase $\Psi$ ($\alpha$; 180°).

It is still to be noted that the duration of each working phase corresponds to the angle (180$-\alpha$) and that upon increase of the angle $\alpha$, i.e. upon increase of the angular speed $\omega$ of the output shafts 81, 82, it decreases. This means that the average value of the transmitted torque decreases when the angular speed of the output shafts 81, 82 increases. Therefore, the hydraulic motor HM according to FIGS. 7 and 8 is of the self-regulating type. When $\omega=0$, then $\alpha=0$ and the transmitted torque reaches its maximum value. Contemporaneously there is a decrease in the losses in the group consisting of the hydraulic motor HM and of the hydraulic machine G. When $\omega=0$, and $\alpha=0$ the losses in the hydraulic motor HM reach a value equal to zero, since there is no movement, while the hydraulic machine G does not supply any power, and its losses, although very low, correspond to a zero delivery of the fluid.

The torque transmitted to the output shafts 81, 82 of the hydraulic motor HM corresponds to the pressure produced by the hydraulic machine G, which increases with the square (second power) of the angular speed $\omega_f$ of the input shaft of the hydraulic machine, i.e. of the driving motor M. Consequently, there is afforded a further possibility of controlling the transmitted torque, by means of limited variations of the rotational speed of the driving motor M. Obviously, a single hydraulic machine can actuate simultaneously a plurality of hydraulic motors.

In the embodiment shown in FIG. 15, the power of a driving motor M can be transmitted, through the hydraulic machine G and the hydraulic motor HM, to a machine MV which can be alternately employed as utilizer and as motor. According to this arrangement, the input shaft F of the hydraulic machine is coupled, by means of the flange 9 and a counter-flange 109, with the shaft 66 of the driving motor M. The auxiliary shaft A of the hydraulic machine G, on the contrary, can be connected by means of a connectable or disconnectable clutch K3 (diagrammatically represented), with its flange 14, alternately to the machine frame 6 (and consequently held secured), or to the shaft 67 of the machine MV (operating as utilizer or motor), through a counter-flange 114. The input E and the output U provided on the connecting sleeve 29 of the hydraulic machine G are connected with the connections R and S respectively of both cylinders 50, 51 of the hydraulic motor HM. An output shaft 81 of the hydraulic motor HM can be coupled to the shaft 66 of the driving motor M through a connectable and disconnectable clutch K2 and a transmission 68. The other output shaft 82 of the hydraulic motor HM can be coupled through a clutch K2 and a transmission 69 with the shaft 67 of the machine MV working alternately as utilizer and as motor. The transmissions 68, 69 and the clutches K1, K2 and K3 can be constructed in any suitable manner.

If the machine MV is to be utilized as a utilizer, the connection between the shaft 66 of the driving motor M and the output shaft 81 of the hydraulic motor HM is disconnected, by means of the clutch K1, while the coupling between the shaft 67 of the machine MV and the other output shaft 82 is obtained, by means of the clutch K2 and the transmission 69. At the same time, the auxiliary shaft A of the hydraulic machine G is disconnected, through clutch K3, from the shaft 67 of the machine MV and secured to the machine frame 6. In this manner there are obtained the same conditions as in the arrangement shown in FIG. 14, i.e. the motor M drives the hydraulic machine G used as torque transducer and associated with the hydraulic motor HM; the hydraulic motor HM drives the machine VM operating as utilizer.

When the machine MV operates as a motor and must for example return stored kinetic energy to the driving motor M, the output shaft 82 of the hydraulic motor HM is disconnected (clutch K2) from the shaft 67 of the machine MV now working as a motor, while the other output shaft 81 of the hydraulic motor HM is coupled, through the clutch K1 and the transmission 68, with the shaft 66 of the driving motor M. At the same time the flange 14 of the auxiliary shaft A of the hydraulic machine G is disconnected, through clutch K3, from the machine frame 6, and it is coupled, through counter-flange 114 with the shaft 67 of the machine MV. In this condition, the auxiliary shaft A of the hydraulic machine G is subjected to a torque $\mu_a$ which presents a value determined, different from zero. The machine MV operating as a motor drives the auxiliary shaft A of the hydraulic machine G in an oppposite rotational direction with respect to the input shaft F and feeds power into the hydraulic machine G. The power is transmitted, through the hydraulic motor HM and the transmission 68, to the driving motor M. The transmission of power from the machine MV operating alternately as utilizer or motor, to the driving motor M, is obtained therefore independently from the ratio between the angular speeds of the shaft 67 of the machine MV and the shaft 66 of the driving motor M. More particularly the shaft 66 of the driving motor M can present a constant angular speed. The angular speed of the shaft 67 of the machine MV can on the contrary be aperiodically uniform, but it must present always the same direction. The contrary direction of rotation of the shaft 66 of the driving motor on one side, and of the shaft 67 of the machine MV on the other side, remains unaltered upon change of the transmission of energy from Motor M-Machine MV to Machine MV-Motor M.

I claim:

1. A hydraulic machine, which can be used at will as a pump or as a torque transducer, comprising:
   (a) an outer rotor rotatably mounted on a machine frame around a first rotational axis and connectable, through an input shaft, to a driving motor;
   (b) an inner rotor mounted at the interior of the outer rotor, said inner rotor being rotatable around a second rotational axis which is perpendicular to said first axis of the outer rotor, and which is connected through a gear drive to an auxiliary shaft coaxial to said input shaft and to said first rotational axis of the outer rotor;
   (c) means for securing said auxiliary shaft to the machine frame or to a transmission, utilizer or control device;
   (d) a hydraulic circuit arranged at the interior of the inner rotor, presenting at least one active circuit, the projection of which on a plane passing through said second rotational axis of the inner rotor defines a final surface different from zero;
   (e) rotary connection means for sealingly connecting the ends of the active circuit with a fixed inflow and a fixed outflow connection;
   whereby to the inner rotor there is associated a field of accelerations of Coriolis which depends on the angular speeds of the outer rotor and of the inner rotor, said field generating, between the ends of the active circuit and more precisely between the inflow and the outflow connections, a pressure difference in the field contained in the hydraulic circuit, which pressure difference is substantially sinusoidally varying.

2. A hydraulic machine according to claim 1, in which the active circuit of the inner rotor consists of at least a partial pipe coil.

3. A hydraulic machine according to claim 1, in which the active circuit of the inner rotor consists of at least a pipe winding.

4. A hydraulic machine according to claim 1, in which the active circuit of the inner rotor consists of at least one pipe portion the path of which extends at a radial distance from said second rotational axis of the inner rotor.

5. A hydraulic machine according to claim 1, being used as a pump, in which the active circuit provided at the interior of the inner rotor consists of a plurality of portions equiangularly arranged around said second rotational axis of the inner rotor, said portions being connected in parallel with the inflow and the outflow connections.

6. A hydraulic machine according to claim 1, being used as a pump, in which the hydraulic circuit contains at least one non-return valve which determines a unidirectional flow from the inflow to the outflow connection.

7. A hydraulic machine according to claim 6, in which the non-return valve is arranged in correspondence with the fixed inflow connection.

8. A hydraulic machine according to claim 7, in which a non-return valve is also arranged in correspondence with the fixed outflow connection.

9. A hydraulic machine according to claim 1, being used as a pump, in which an inflow pipe is connected both to the inflow and to the outflow connections through two non-return valves connected in parallel and opening in the inflow direction, and an outflow pipe is connected both to the inflow and to the outflow connections through two non-return valves connected in parallel and opening in the outflow direction.

10. A hydraulic machine according to claim 5, in which each portion of the active circuit is connected with the inflow connection, and with the outflow connection, respectively, by means of a non-return valve.

11. A hydraulic machine according to claim 10, in which the non-return valves are arranged at the interior of the inner rotor.

12. A hydraulic machine according to claim 1, being used as torque transducer, in which there is further provided at least one hydraulic motor presenting two coaxial cylinders of which one is connected with the outflow connection and the other is connected with the inflow connection of the hydraulic machine, at the interior of said cylinders there being slidably housed two pistons which are connected to each other by means of a toothed rack which engages the toothed portions of outer rings of a pair of freewheels, each one of said freewheels being lockable in a direction opposite to the locking direction of the other, said freewheels being further coupled to respective output shafts.

13. A hydraulic machine according to claim 12, in which the output shafts of the hydraulic motor are coupled to each other by means of intermeshing gear wheels.

14. A hydraulic machine according to claim 12, in which the input shaft is connected to a driving motor and the auxiliary shaft is anchored to the machine frame, and at least one of the output shafts of the hydraulic motor is coupled to a utilizer.

15. A hydraulic machine according to claim 12, in which a driving motor is connectable, by means of clutch means, alternately with the input shaft of the hydraulic machine or with said input shaft of the hydraulic machine and one of the output shafts of the hydraulic motor, while a machine working alternately as utilizer or as motor can be coupled alternately to the output shaft of the hydraulic motor, with contemporaneous anchoring of the auxiliary shaft of the hydraulic machine to the machine frame, or it can be coupled with said auxiliary shaft of the hydraulic machine, with contemporaneous coupling of the other output shaft of the hydraulic motor to the driving motor.

* * * * *